United States Patent [19]

Landuydt

[11] Patent Number: 4,819,365

[45] Date of Patent: Apr. 11, 1989

[54] FISHING LURE

[76] Inventor: Louis Landuydt, 200 Ducharme, Dorval, Quebec, Canada, H9S 2H7

[21] Appl. No.: 55,634

[22] Filed: May 29, 1987

[30] Foreign Application Priority Data

Jun. 20, 1986 [CA] Canada .................................. 512117

[51] Int. Cl.⁴ ............................................ A01K 85/00
[52] U.S. Cl. .................................. 43/42.47; 43/42.42; 43/42.4
[58] Field of Search .................. 43/42.42, 42.4, 42.41, 43/42.1, 42.44, 42.47, 42.18

[56] References Cited

U.S. PATENT DOCUMENTS

| 1,419,540 | 6/1922 | Brown | 43/42.42 |
|---|---|---|---|
| 1,746,753 | 2/1930 | Whitney | 43/42.4 |
| 1,840,273 | 1/1932 | Lang | 43/42.42 |
| 2,079,883 | 5/1937 | Valasek | 43/42.42 |
| 2,333,174 | 11/1943 | Heddon | 43/42.47 |
| 2,503,369 | 4/1950 | Wycech | 43/42.47 |
| 2,580,104 | 12/1951 | King | 43/42.47 |
| 2,598,360 | 5/1952 | Cummins | 43/42.47 |
| 3,768,194 | 10/1973 | Murray | 43/42.4 |

Primary Examiner—Kurt Rowan
Attorney, Agent, or Firm—32Bacon & Thomas

[57] ABSTRACT

A fishing lure, comprising a body having a front part provided with an eye to which is connected a fishing line, and a lip provided at the front part of the body. Elements are provided for preventing algae and seaweeds from being caught between the fishing line and the lip during the forward pulling of the lure in the water. These elements have a first end pivotally attached to the lip and a second end slidably attached to the fishing line at a distance from the eye. Further elements may be provided beneath the body of the lure, with their both ends integrally connected to the body. These further elements prevent seaweeds and algae from being collected by the tail hook during the forward pulling of the lure. A rear bottom treble pendent hook may be secured to the tail of the lure in order to prevent its dangling.

16 Claims, 5 Drawing Sheets

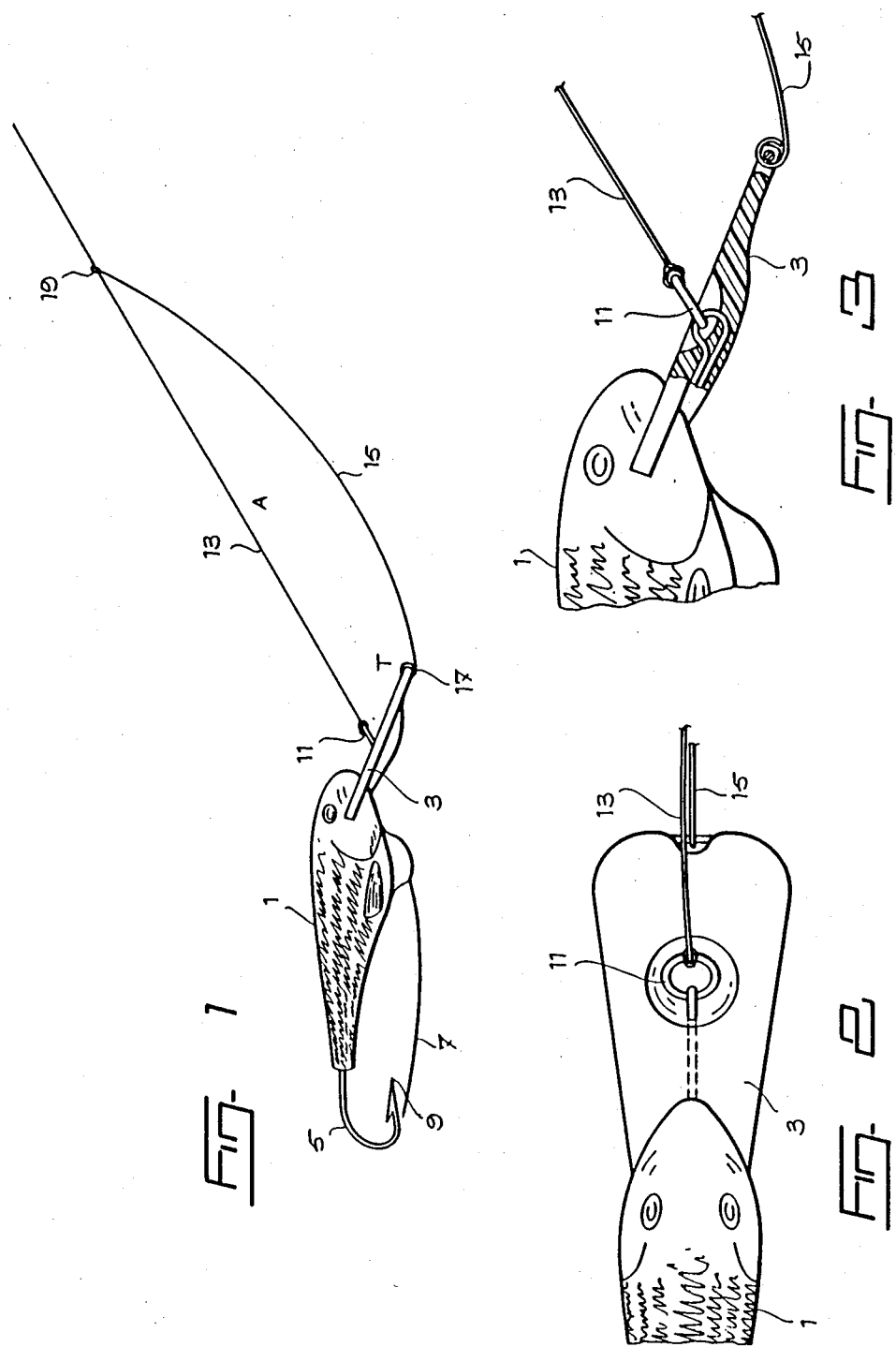

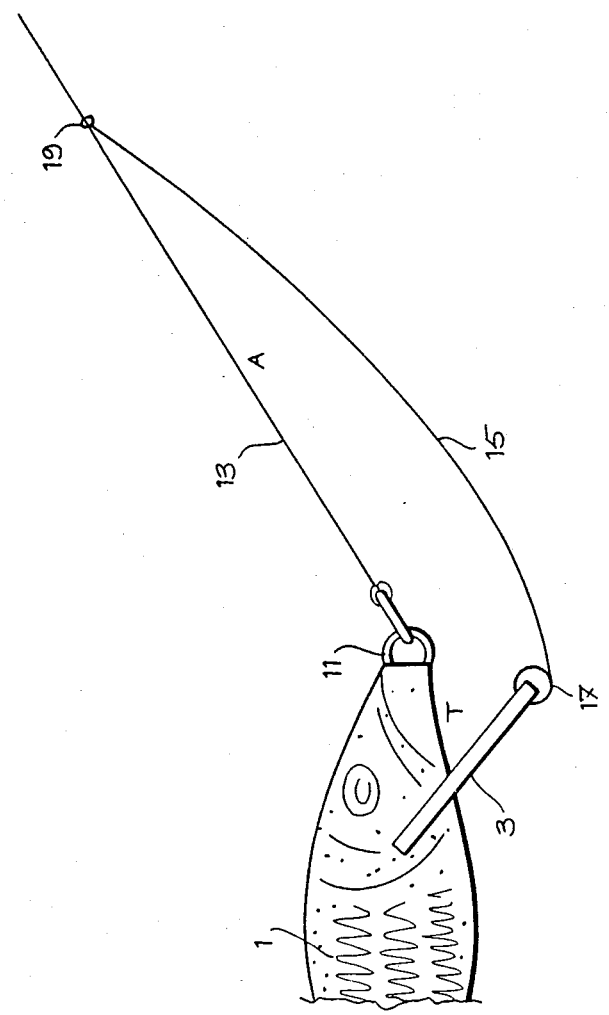

FISHING LURE

BACKGROUND OF THE INVENTION

1. Field of the Invention

The present invention relates to a fishing lure.

2. Description of the Prior Art

A conventional fishing lure comprises a body usually in the form of a fish having an eye at the front part of the body for receiving a fishing line. Hook hangers are provided beneath the body and at the tail end thereof, in order to receive hooks. A lip or bill is provided at the front part of the body. Sometimes, the eye is on the lip. A fishing line is attached to the eye and pulls the body of the lure forward in the water.

A drawback of such conventional lure is that when it is pulled forward, different kinds of seaweeds and algae have a tendency to be caught in the space formed between the fishing line and the lip, thus hampering the forward movement of the lure in the water.

Another drawback emanates from the hook provided at the tail part thereof, which in its forward movement has also tendency to collect seaweeds and algae, thus diminishing the efficiency of the hook and also hampering the easy forward movement of the lure in the water.

In some conventional lures, a kind of string, filament or whisker is provided beneath the body of the lure to overcome this last mentioned drawback. Such filament has an end connected to the front part of the body and another end freely facing or adjacently positioned to the point of the hook provided at the tail of the lure. It has been noted that with such filament having a free end, some seaweed and algae were inevitably collected by the tail hook.

A further drawback emanates from the fact of having a hook, usually a treble hook, pendent from the bottom of the lure at the rear part thereof and which in the forward movement of the lure in the water, inevitably dangles. When a fish approaches from the rear and bites the tail of the lure and in case the lure does not have a tail hook, it sometimes happens that before reaching the treble hook pendent from the bottom of the lure and being caught thereby, the fish senses the artificiality of the lure, and abandons it and moves away.

OBJECTS OF THE INVENTION

The present invention overcomes the above drawbacks and provides a fishing lure which is easily manufactured and is more efficient than any conventional lure due to the fact that it prevents most of the seaweeds and algae from being caught in the space between the fishing line and the lip and also by the hook provided at the tail part of the body during the forward pulling of the lure in the water.

The present invention also overcomes the last drawback and provides a rear treble hook which though pendent from the bottom of the lure is prevented from dangling during the displacement of the lure in the water.

SUMMARY OF THE INVENTION

According to the present invention, there is provided a fishing lure, comprising a body having a front part and a fishing line connected to said body, said lure further comprising:

means for preventing algae and seaweeds from being cought between the fishing line and the front part of the body.

According to one aspect of the present invention, there is also provided a fishing lure comprising:

a body having a front part provided with an eye to which is connected a fishing line, a lip provided at said front part, and means for preventing algae and seaweeds from being cought between the fishing line and the lip, said means having a first end pivotally attached to said lip and a second end slidingly attached to said fishing line at a distance from said eye.

Preferably, the means for preventing comprises a filament which is a straight but flexible metallic filament and which is curved outwardly when it is attached to the lip and the fishing line.

The eye may be provided on the lip, or it may be provided on the nose part of the body.

According to one embodiment, the lure may comprise further means provided at the bottom of the body for preventing seaweeds and algae from being collected by a tail hook, these further means being connected to the body of the lure.

Preferably, these further means provided at the bottom is a flexible filament having one end connected to the bottom of the body of the lure and another end connected to the tail of the lure, the filament having a curved shape more pronounced at the tail part such that, when a fish bites the tail hook, it deforms the flexible filament and is caught by the tail hook, while during the forward displacement of the lure such filament resists deformations caused by the pressure of the seaweeds and algae and thus prevents the seaweeds and algae from being collected by the tail hook.

The bottom filament may consist of double filaments made of nylon and spaced from each other.

Preferably, the double filaments are integrally connected to the body of the lure during the injection process.

According to another embodiment, the fishing lure further comprises means at the tail of the lure, said means being adapted to hold one of the points of a rear treble hook, said treble hook thus being prevented from dangling during the displacement of the lure in the water.

Preferably, the means at the tail of the lure is a cavity provided at the tail of the lure, said cavity having means adapted to releasably hold one of the points of the rear treble hook. Said means can also be an insert lodged in a cavity provided at the tail of the lure, this insert being adapted to releasably hold one of the points of a treble hook pendent from the bottom of the lure at the rear part thereof, such treble hook thus being prevented from dangling during the displacement of the lure in the water.

According to yet another embodiment, the fishing lure further comprises a pair of bottom filaments having front ends connected to the front part of the body and rear ends adjacently and freely positioned at either side of the treble hook held by said insert.

In a preferred embodiment, the pair of bottom filaments is connected to said front bottom part of the body by means of a screw.

BRIEF DESCRIPTION OF THE DRAWINGS

Preferred embodiments will now be described as examples without limitative manner, having reference the attached drawings wherein:

FIG. 1: is a side view of one embodiment of a fishing lure provided with a fishing line and with means for preventing seaweed and algae having tendency to be collected between the eye to which the fishing line is connected and the lip;

FIG. 2: is a top view of the front part of FIG. 1;

FIG. 3: is a detail view partly in cross-section of the front part of the lure;

FIG. 4: is one embodiment of a fishing lure showing an eye provided at the front part of the body;

DESCRIPTION OF EXEMPLARY EMBODIMENTS

Figure 5:
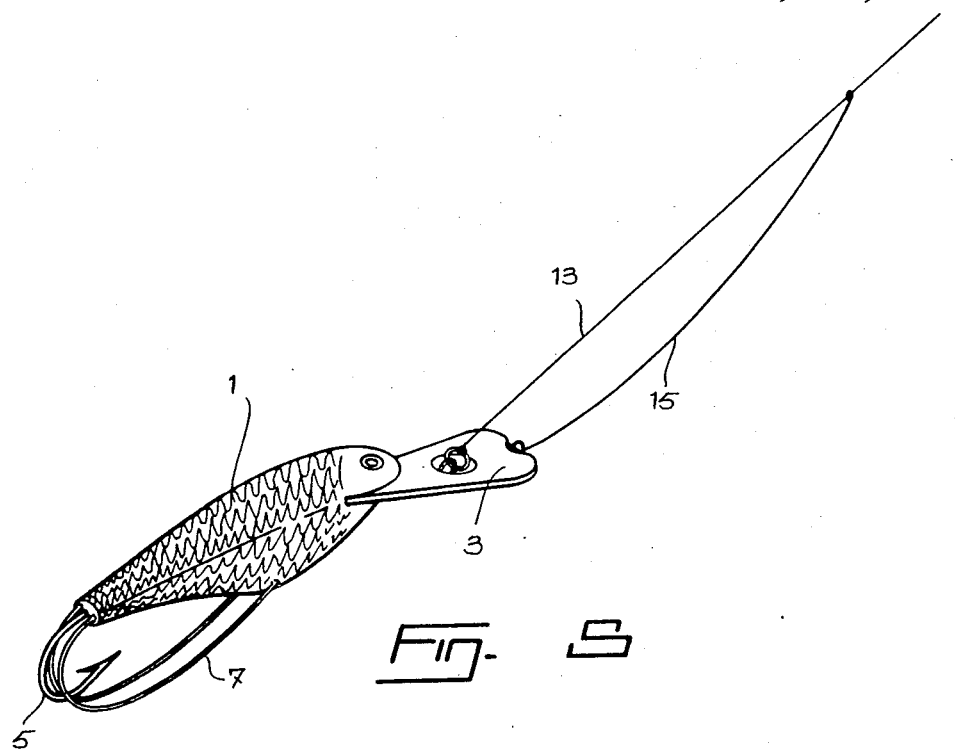
FIG. 5: is another embodiment of the fishing lure showing bottom means for preventing seaweed and algae having tendency to be collected by the tail hook.

Referring now to the drawings, FIG. 1 shows a fishing lure having a body 1 usually in the form of a fish provided at its front part with a lip or bill 3. A hook 5 is shown fixed to the tail of the body.

Beneath the body, there is a filament or whisker 7 connected with one of its ends to the front part of the body and having its other end free and located adjacent to the point 9 of the tail hook 5.

An eye 11 is pivotally connected to the lip 3 and receives one end of a fishing line 13.

The means for preventing algae and seaweeds from being caught in the substantially triangular space T between the fishing line 13 and the lip 3 consists of a straight but flexible metallic filament or fine rod 15, which has one of its ends 17 pivotally connected to the front part of the lip 3 and has its other end 19 slidingly attached, at a certain distance A from the eye 11, to the fishing line 13. In such position the filament may flex and curve outwardly.

When the lure is pulled forward, the filament or rod 15, which is metallic or in steel, prevents the seaweeds or algae from being collected in the substantially rectangular space T formed between the fishing line 13 and the lip 3. Thus, the forward movement of the lure is improved.

FIG. 4 shows an embodiment of the fishing lure wherein the eye 11 to which one end of the fishing line 13 is connected, is provided at the nose part of the body instead of being provided on the lip 3.

The filament or rod 15 is, as in the first embodiment, pivotally connected with one of its ends 17 to the free part of the lip 3, its other end 19 being slidingly connected at a certain distance A to the fishing line 13.

Figure 6:
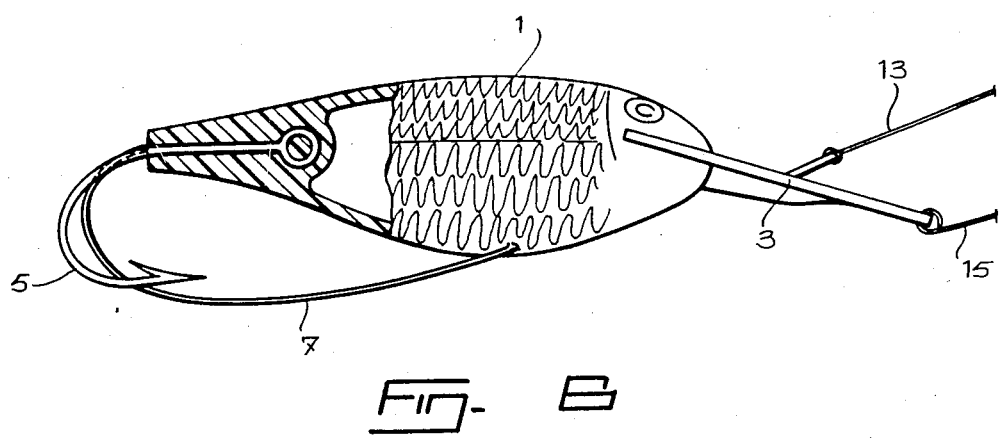
FIG. 6: is a side view of the embodiment shown in FIG. 5.

FIGS. 5 and 6 show another embodiment wherein the bottom means for preventing seaweeds and algae from being collected by the tail hook 5 consist of a pair of flexible filaments or whiskers 7, made of metal or nylon, which have their forward and rearward ends rigidly connected to the body 1. The rear ends of the pair of filaments 7 are integrally connected to the tail of the lure and are so connected during the injection process of the lure.

The filaments 7 have a curved shape more pronounced at the tail part of the body such that when a fish bites the tail hook it deforms the flexible filaments or whiskers 7 and is caught by the tail hook 5, while during the forward displacement of the lure such filaments 7 resist deformations caused by the pressure of the seaweeds and algae and thus prevents the seaweeds and algae from being collected by the tail hook.

The advantage of providing such a bottom filament or whiskers 7 having the shape as indicated in FIGS. 5 and 6 is that it prevents the majority of seaweed or algae from being collected by the tail hook of the lure. In the prior art which did not provide a filament or whiskers integral with the body 1 of the lure, some seaweed or algae were inevitably collected by the tail hook.

Figure 7:
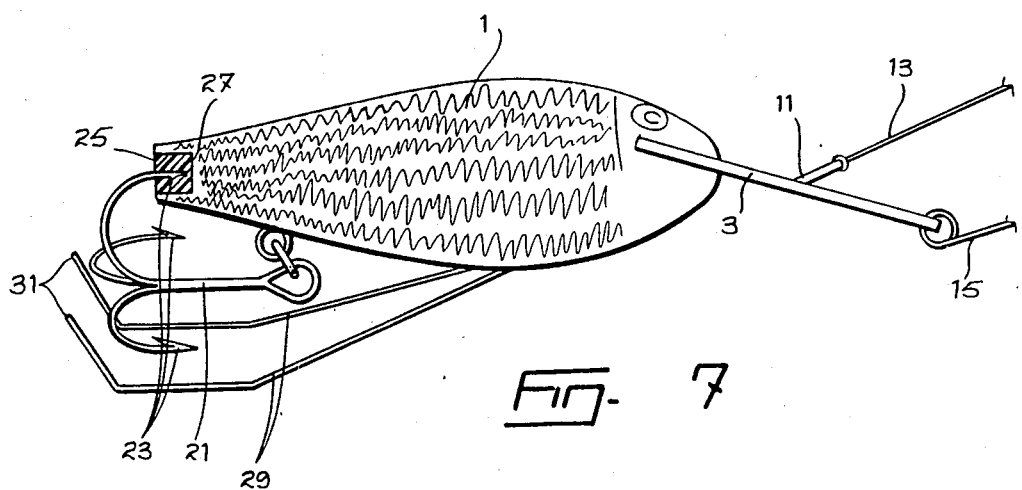
FIG. 7: is a further embodiment of the fishing lure showing a bottom treble hook having one of its points held by an insert provided at the tail of the lure.

FIG. 7 shows a further embodiment wherein a treble hook 21 is pendent from the bottom of the lure body 1 at the rear part thereof. This treble hook 21 has one of its points 23 inserted inside an insert 25 provided in a cavity 27 at the tail of the lure and is held thereby and is thus prevented from dangling during the displacement of the lure in the water. With such a positioning of the rear treble hook 21, when a fish bites from the tail of the lure, the chances are much greater that the fish is caught by the three points 23 of the rear treble hook 21 than if such treble hook 21 was pendent and dangling from the bottom of the lure. This eliminates or at least lessens the occurrence of the situation when a fish after biting the tail of a lure not provided with a tail hook, and without further moving forward towards the head of the lure, changes his mind and moves away without being bothered by a treble hook pendent from the bottom of the lure.

If a fish approaches from the side and wants to bite the tail of the lure, the hook 21 held by the insert 25 as shown in FIG. 7 is in a better position to catch the fish.

In this embodiment, a pair of bottom filaments or whiskers 29 are provided, each having one end firmly connected or screwed to the front part of the body and a rear end 31 adjacently and freely positioned at one side of the treble hook 21 held by the insert 25.

The pair of filaments may be of nylon or steel and may have a broken form.

Figure 8:
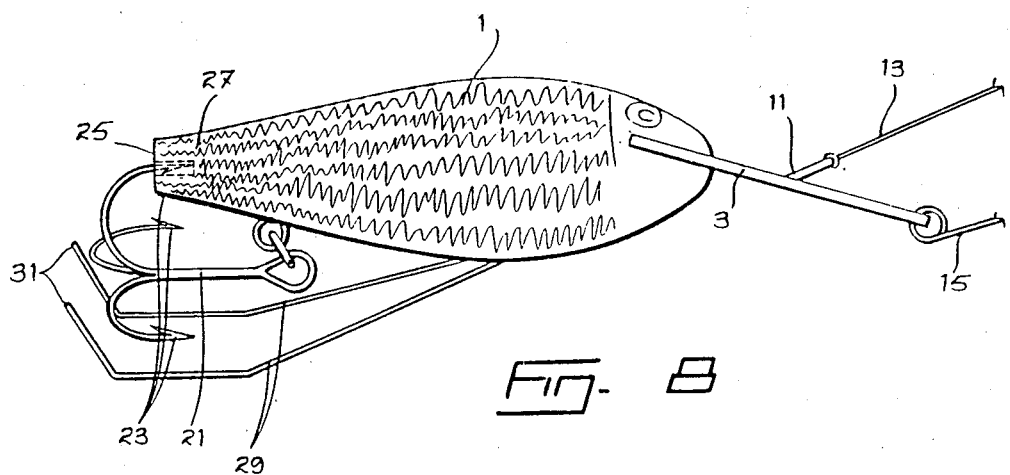
FIG. 8: is a view similar to FIG. 7, showing the point of the treble hook held inside a tail cavity.

Instead of an insert, a cavity as shown in FIG. 8 provided with holding means, may be provided at the tail part of the lure for releasably holding one of the points of the rear treble hook during the displacement of the lure in the water.

I claim:

1. A fishing lure, comprising:
   a body having a front part provided with an eye to which is connected a fishing line,
   a guiding lip provided at said front part, and
   deformable means for preventing algae and seaweeds from being caught between the fishing line and the lip, said deformable means having a first end pivotally attached to said lip and a second end slidably attached to said fishing line at a distance from said eye.

2. Fishing lure, according to claim 1, wherein said deformable means comprises a filament.

3. Fishing lure according to claim 2, wherein said filament is a straight but flexible metallic filament.

4. Fishing lure according to claim 3, wherein said filament is curved outwardly when it is attached to said lip and said fishing line.

5. Fishing lure according to claim 1, wherein said eye is provided on said lip.

6. Fishing lure according to claim 1, wherein said eye is provided at the nose part of the body.

7. Fishing lure according to claim 1, comprising further means provided at the bottom of the lure for preventing seaweeds and algae from being collected by a tail hook, said further means being integrally connected to the body of the lure.

8. Fishing lure according to claim 7, wherein said bottom means is a flexible filament having one end connected to the bottom of the body of the lure and another end connected to the tail of the lure, said filament having a curved shape more pronounced at the tail part such that when a fish bites the tail hook it deforms the flexible filament and is caught by the tail hook, while during the forward displacement of the lure in the water, the filament resists to deformations caused by the pressure of the seaweeds and algae and thus prevents said seaweeds and algae from being collected by the tail hook.

9. Fishing lure according to claim 8, comprising a pair of said filament made of nylon and spaced from each other.

10. Fishing lure according to claim 9, wherein said pair of filaments are integrally connected to the body of the lure during an injection process.

11. A fishing lure according to claim 1, further comprising an insert lodged in a cavity provided at the tail of the lure, said insert being adapted to releasably hold one of the points of a treble hook pendent from the bottom of the lure at the rear part thereof, said treble hook thus being prevented from dangling during the displacement of the lure in the water.

12. A fishing lure according to claim 11, wherein said insert is made of rubber.

13. A fishing lure according to claim 12, further comprising a pair of bottom filaments having front ends connected to the front part of the body and rear ends adjacently and freely positioned at either side of the treble hook held by said insert.

14. A fishing lure according to claim 13, wherein said pair of bottom filaments is connected to said front bottom part of the body by means of a screw.

15. A fishing lure according to claim 1, further comprising holding means at the tail of the lure, said holding means being adapted to hold one of the points of a rear treble hook, said treble hook thus being prevented from dangling during the displacement of the lure in the water.

16. A fishing lure according to claim 15, wherein said holding means includes a cavity provided at the tail of the lure, said cavity being adapted to releasably hold one of the points of said rear treble hook.

* * * * *